United States Patent
Elliott

[15] 3,652,777
[45] Mar. 28, 1972

[54] AUTOMATIC STOP JOINT FOR PIPE-TYPE CABLE

[72] Inventor: James H. Elliott, Columbus, Ohio

[73] Assignee: Electrical Constructors and Associates, Columbus, Ohio

[22] Filed: Mar. 16, 1970

[21] Appl. No.: 19,978

[52] U.S. Cl. .......................................... 174/11 R, 174/23 R
[51] Int. Cl. ........................................................ H02g 15/20
[58] Field of Search ................ 174/11 R, 22 R, 22 C, 23 R; 285/96, 97, 106; 137/500; 277/12, 15, 16, 27, 28, 34, 34.3, 34.6

[56] References Cited

UNITED STATES PATENTS

| | | | |
|---|---|---|---|
| 2,050,888 | 8/1936 | Kirch | 174/11 R |
| 2,113,746 | 4/1938 | Reynolds | 174/22 R |
| 2,615,952 | 10/1952 | Rifenburg | 174/23 R |
| 2,740,825 | 4/1956 | Rifenburg | 174/23 R |

Primary Examiner—Laramie E. Askin
Attorney—Cennamo, Dunbar & Kremblas

[57] ABSTRACT

An automatic stop joint for a pipe-type electrical cable characterized by a stop gland means mounted between adjacent portions of the cable and the inner wall of the conduit carrying the cable. The stop gland means includes an expandable chamber and moveable wall means which are automatically activated to move between sealing and nonsealing relationship with the cable and conduit portions responsive to the occurrence of a pressure differential across the stop joint and a subsequent dissipation of that pressure differential.

4 Claims, 7 Drawing Figures

PATENTED MAR 28 1972 3,652,777

INVENTOR
JAMES H. ELLIOTT

BY Cennamo, Dunbar & Kremblas
ATTORNEY

AUTOMATIC STOP JOINT FOR PIPE-TYPE CABLE

The present invention relates generally to stop joints for an oilstatic or pipe-type electrical cable and particularly to a novel stop joint which is automatically actuated to a sealing configuration responsive to a pressure differential across the joint.

In general the stop joint of the present invention comprises a resilient stop gland means mounted in a fluid filled conduit carrying an electrical cable. The gland means is automatically expandable from a non-sealing to a sealing relationship between the inner surface of the conduit and the cable. The stop joint also includes means forming a restriction to the flow of pressurized fluid across the joint which are fixedly mounted to the conduit on each side of the stop gland means. An automatic valve means responsive to a pressure differential across said means forming a restriction functions to actuate the expansion or contraction of said gland means.

Prior to the present invention, conventional stop joints consisted of a permanent barrier of packing gland material disposed in sealing relationship between the cable and the inner surface of the fluid filled conduit and spaced from one another to isolate sections of conduit. Therefore a rupture in the conduit, caused only the loss of fluid from one section. In some instances, by-pass piping was employed with an appropriate manual gate valve to permit communication between sections when the by-pass was open and to isolate each section from one another when the gate valve was closed.

One disadvantage of this arrangement is that the gland material, which is tightly packed around the cable, has a clamping action on the cable during thermal expansion and contraction. Therefore the insulating wrapping on the cable is subjected to stresses and potential failure. In cable of this type, such failure could lead to very expensive damage and loss of essential service to consumers.

Therefore it is an object of the present invention to provide an automatically actuated stop joint for an oilstatic electrical cable which is actuated to seal the joint only when a pressure drop occurs across the stop joint.

It is another object of the present invention to provide a stop joint of the type described which automatically contracts to a non-sealing configuration after the pressure across the joint becomes equalized thereby releasing frictional contact on the cable.

It is another object of the present invention to provide a stop joint of the type described which includes means to permit manual actuation of the stop joint to isolate a section of the conduit for repair purposes or the like.

Figure 1:
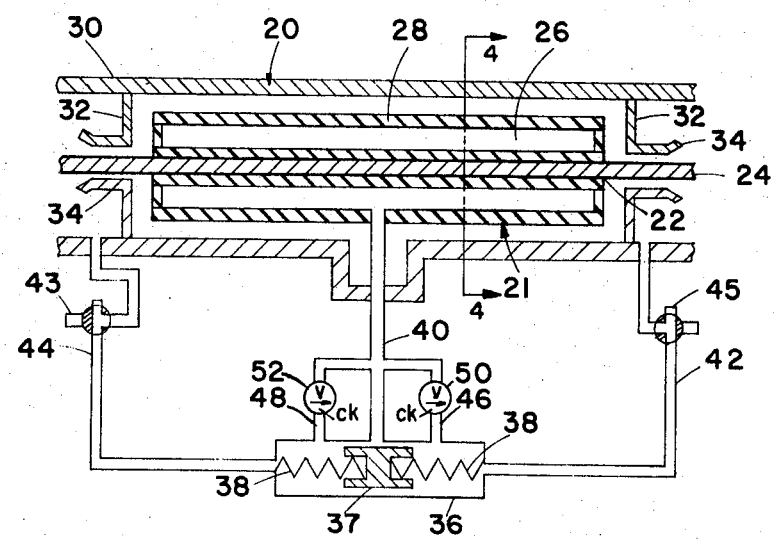
FIG. 1 is a side sectional view of a pipe type cable illustrating an automatic stop joint constructed in accordance with the present invention.

Referring in detail to the drawings an automatic stop joint indicated generally at 20 for a pipe-type electrical cable is illustrated in FIG. 1 and includes a stop gland means indicated generally at 21. For purposes of simplicity, only a single cable is illustrated, however, the same principles hereinafter disclosed could be adapted to a plurality of cables mounted in a conduit without departing from the spirit of the present invention.

Stop gland means 21 includes a centrally disposed passage or hole 22 through which an insulated electrical cable 24 passes in relatively loose-fitting relationship and a circular expandable chamber 26 formed by resilient walls 28 which completely surrounds cable 24.

Cable 24 is mounted in a conventional conduit 30 which is filled with a pressurized insulating fluid such as oil.

Chamber 26 is expandable from a non-sealing relationship shown in FIG. 1 to a sealing relationship between the inner surface of conduit 30 and that portion of cable 24 passing through hole 22.

Circular barriers 32 fixed to the inner walls of conduit 20, include tube-like extensions 34 surrounding cable 24 in a close-fitting relationship to form a restricted passage means. Barriers 32 function to restrict the longitudinal travel of stop gland means 21 and the passage means formed by extensions 34 form a restriction to the flow of fluid across the stop joint to magnify any pressure drop that might occur and therefore increase the sharpness of the pressure signal to automatic actuating valve means 36.

Actuating valve means 36 preferably is a conventional three-way spool valve with the spool 37 being biased in a normal center position by springs 38 to close a passage 40 which communicates with chamber 26 of stop gland means 20.

The right side of valve means 36 is communicated to the right side of the stop joint via passage 42 and the left side of the valve means is communicated to the left side of the stop joint via passage 44. Under normal operating condition the pressure on each side of the stop joint is equal and spool 37 remains in balance in the center portion.

Passages 46 and 48 which include check valves 50 and 52 communicate passage 40 to each side of spool 37 to prevent pressure from building up within chamber 26 during normal operation to cause premature expansion of chamber 26.

Three way valves 43 and 45 manually actuate the stop gland and permit either the left or right section of the conduit to be drained as desired for repair purposes or the like. Opening valve 43, for example, causes a lowering of pressure in passage 44. A pressure differential therefore occurs which is sensed by valve spool 37 which is moved to the left to close passage 48 and open passage 40. Chamber 26 is thusly communicated to the high pressure on the right side of the stop joint and therefore expands to a sealing configuration to isolate the left section of conduit 30 from the right section. The reverse action occurs if valve 45 is opened.

A rupture in conduit 30 on either side of the stop joint causes the same action to occur as opening either valve 43 or 45.

Upon equalization of the pressure on each side of the joint, spool 37 returns to its normal center position closing passage 40. Chamber 26 is then permitted to drain through passages 46 and 48 and check valves 50 and 52 and resilient walls 28 return to their original non-sealing configuration.

Figure 2:
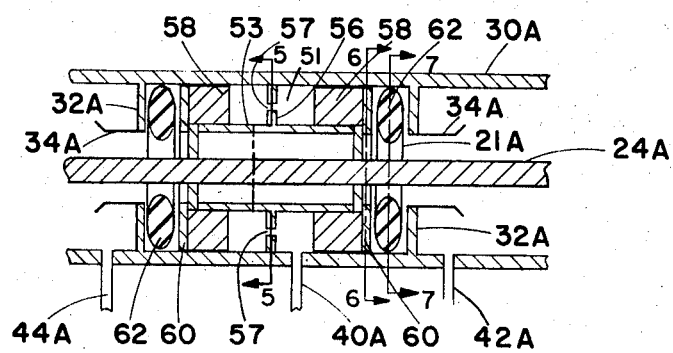
FIG. 2 is a side sectional view of another embodiment of the present invention illustrating a modified construction of an expandable stop gland.

Now referring to FIG. 2, a modified stop gland means indicated generally at 21A includes a cylinder 51 formed by a cylindrical sleeve-like member indicated generally at 53 and the inner wall of conduit 30A.

Member 53 includes a centrally disposed circular flange portion 56 mounted in close fitting relationship between the upper and lower inner surfaces of conduit 30A. Flange portion 56 divides cylinder 51 into right and left portions which are communicated to one another via passages 57 provided in flange portion 56. Cable 24 is extended through the hollow sleeve portions of member 53.

A ring shaped piston 58 is mounted over cable 24A at each end of cylinder 51 in force-transmitting engagement with a washer 60 which in turn is confronted by a ring-shaped gland 62 composed of a resilient material which is also mounted over cable 24A.

A circular barrier 32-A fixed to conduit 30A is disposed adjacent to each gland 62 and includes a tube-like extension 34A through which cable 24A passes to form a restricted passage to the flow of fluid across the stop joint.

A passage 40A communicates cylinder 51 to an appropriate valve means, not shown, such as described in the embodiment of FIG. 1 for example, and passages 42A and 44A similarly communicate the valve means with conduit 30A on each side of the stop joint.

Upon the occurrence of a pressure drop across the joint, the valve means, in like manner as previously described, operates to communicate pressure to cylinder 51 which in turn causes pistons 58 to move outwardly to force washers 60 into force transmitting engagement with glands 62. This action squeezes resilient glands 62 against barriers 32A and results in a radial expansion of the glands 62 into sealing relationship between the inner surface of conduit 30A and the outer surface of cable 24A.

Upon equalization of pressure across the joint, the valve means automatically moves to drain cylinder 51 to release the force against glands 62 which return to their original non-sealing configuration.

Figure 3:
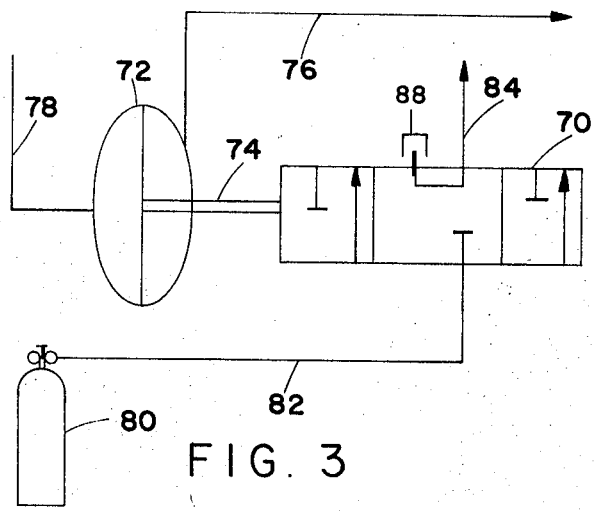
FIG. 3 is a diagrammatic view of a modified actuating valve arrangement forming a portion of the present invention wherein a separate source of pressurized fluid is utilized to cause sealing expansion of the stop gland.
Figure 4:
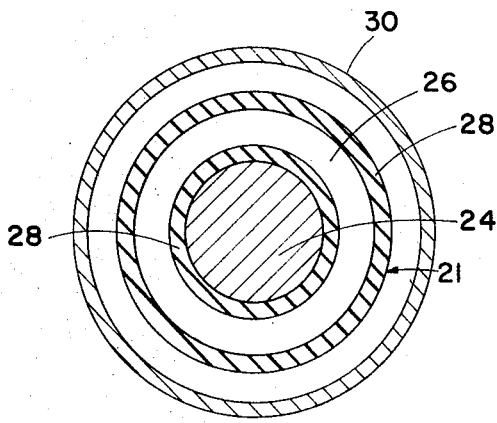
FIG. 4 is a sectional end view of the cable and stop joint construction shown in FIG. 1, the section being taken along line 4—4 in FIG. 1.
Figure 5:
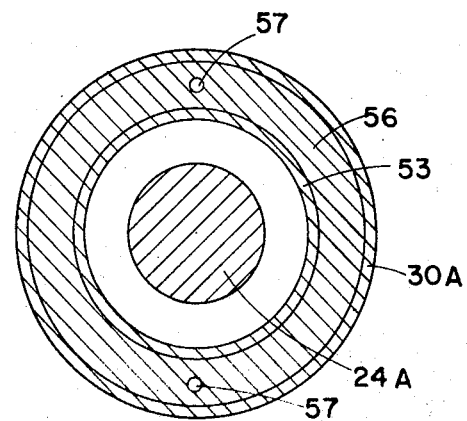
FIG. 5 is a sectional end view of the alternative embodiment shown in FIG. 2, the section being taken along line 5—5 in FIG. 2.
Figure 6:
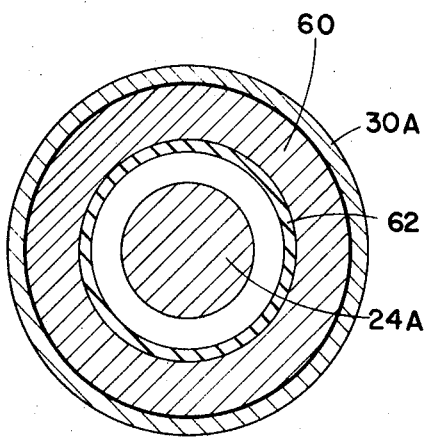
FIG. 6 is a sectional end view of the embodiment shown in FIG. 2, the section being taken along line 6—6 in FIG. 2.
Figure 7:
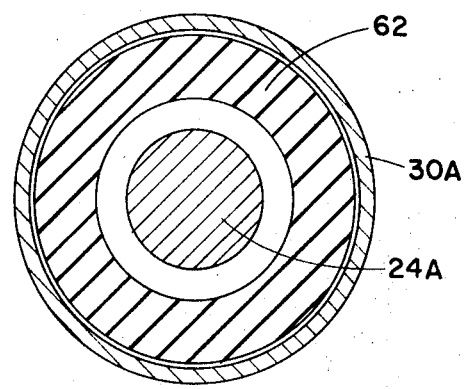
FIG. 7 is another sectional end view of the embodiment shown in FIG. 2, the section being taken along line 7—7 in FIG. 2.

Referring now to FIG. 3, a modified valve actuating system is diagrammatically shown to illustrate another embodiment wherein a separate source of pressure is employed to expand the stop gland means of either of the embodiments shown in FIGS. 1 and 2.

A conventional spool valve diagrammatically illustrated at 70 communicates with a diaphragm 72 via passage 74. One side of diaphragm 72 is communicated via passage 76 to the conduit on the right side of the stop gland means, not shown, and the other side of diaphragm 72 communicates with the conduit on the left side of the stop gland means via passage 78.

A separate source of pressurized fluid 80, such as nitrogen or the like, is communicated to the spool valve via passage 82 and then to an expandable chamber, such as chamber 26 in the embodiment shown in FIG. 1, or the cylinder 51 shown in FIG. 2 via passage 84.

Normally the pressure in the conduit carrying the electrical cable is substantially equal, however when a pressure differential occurs across the stop joint, diaphragm 72 actuates spool valve 70 to open communication between passages 82 and 84 to actuate the expansion of the gland means to a sealing configuration.

Passage 84 is also communicated to drain 88 through appropriate check valves or restricted orifices or the like to permit the gland means to contract to its normal non-sealing configuration when the pressure differential across the stop joint returns to zero.

It should be noted that the use of a separate source of pressure to expand the gland means permits a higher pressure to be used if desired to effect the sealing of the joint than the pressure available in the conduit.

In operation, of the embodiment shown in FIG. 1, spool 37 remains centered to close passage 40 during normal operation wherein the pressure in conduit 30 is substantially equal on each side of stop joint 20.

During this time of equal pressure, gland means 21 exerts substantially no frictional force against cable 24 during thermal movement of the cable. Therefore gland means 21 causes no substantial frictional wear upon cable 24 compared to the conventional permanent type stop glands. The potential failure in the outer insulation wrapped around cable 24 is thereby greatly minimized.

However, if a rupture occurs in conduit 30, the pressure drop created across the stop joint will be sensed by spool valve 36.

The side of higher pressure causes spool 37 to move away from center toward the low pressure side as communicated via passages 42 and 44. As the spool moves off center, it closes communication between the low pressure side and passage 40 and opens passage 40 to communication with the high pressure side.

The high pressure is then communicated to chamber 26 to cause expansion of resilient wall 28 into a sealing configuration between the inner surface of conduit 30 and cable 24 to prevent the flow of fluid across the gland means.

As previously described, after repair of the rupture and repressurization, the gland means returns to its original configuration wherein the cable 24 is not tightly clamped by the gland material.

It is important to point out that other configurations of gland means may be used in combination with many other forms of valve actuating systems without departing from the spirit of the present invention.

I claim:

1. An automatic stop joint for a pipe-type electrical cable carried in a conduit filled with a pressurized fluid comprising, in combination, stop gland means mounted in non-sealing relationship between a length of said cable and an adjacent portion of the inner wall surface of said conduit, said gland means including an expandable chamber having wall means movable into a sealing relationship with said cable and said inner wall surface of said conduit; and valve means communicating with said expandable chamber and with the fluid on each side of said gland means for automatically communicating said chamber to a source of pressure responsive to a pressure differential occurring across said gland means and communicating said chamber to a pressure equal to or less than the pressure in said conduit responsive to a dissipation of said pressure differential across said gland means.

2. The stop joint defined in claim 1 wherein said gland means includes a resilient collar normally mounted in surrounding, non-sealing relationship to a portion of said cable, said collar including said expandable chamber defined by resilient wall means movable into sealing relationship between said cable and the inner surface of said conduit upon communicating a source of pressure to said chamber.

3. An automatic stop joint for a pipe-type electrical cable carried in a conduit filled with a pressurized fluid comprising, in combination, stop gland means mounted in non-sealing relationship between a length of said cable and an adjacent portion of the inner wall surface of said conduit, said gland means including an expandable chamber having wall means movable into a sealing relationship with said cable and said inner wall surface of said conduit; restricting means disposed in said conduit adjacent to each end of said gland means defining a resistance to the flow of fluid past said gland means; and valve means communicating with said expandable chamber and with the fluid on each side of said restricting means for automatically communicating said chamber to a source of pressure responsive to a pressure differential occurring across said restricting means and communicating said chamber to a pressure equal to or less than the pressure in said conduit responsive to a dissipation of said pressure differential across said restricting means.

4. The stop joint means defined in claim 3 wherein said chamber defines a cylinder and said wall means includes a piston reciprocally mounted in said cylinder, said piston confronting a resilient ring-shaped gland which is expandable into a sealing relationship between said cable and the adjacent inner wall surface of said conduit upon force-transmitting engagement with said piston.

* * * * *